Figure 1:
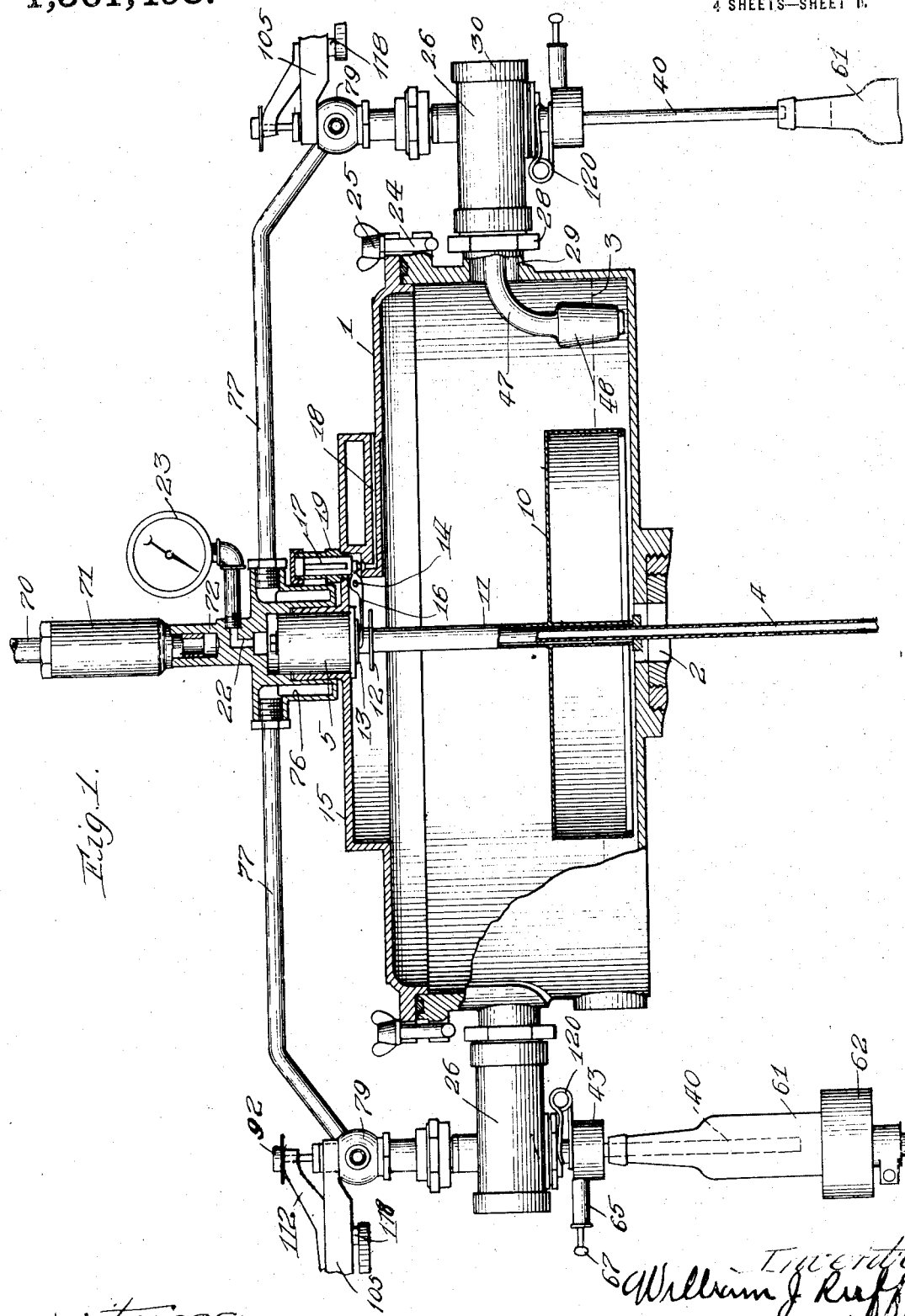

W. J. RUFF.
METHOD FOR PRESERVING CARBONATED BEVERAGES.
APPLICATION FILED FEB. 25, 1916.

1,361,498.

Patented Dec. 7, 1920.
4 SHEETS—SHEET 1.

Witness:
R. L. Farrington

Inventor
William J. Ruff
By Brown, Nissen & Sprinkle
Attys.

W. J. RUFF.
METHOD FOR PRESERVING CARBONATED BEVERAGES.
APPLICATION FILED FEB. 25, 1916.
1,361,498. Patented Dec. 7, 1920.
4 SHEETS—SHEET 2.
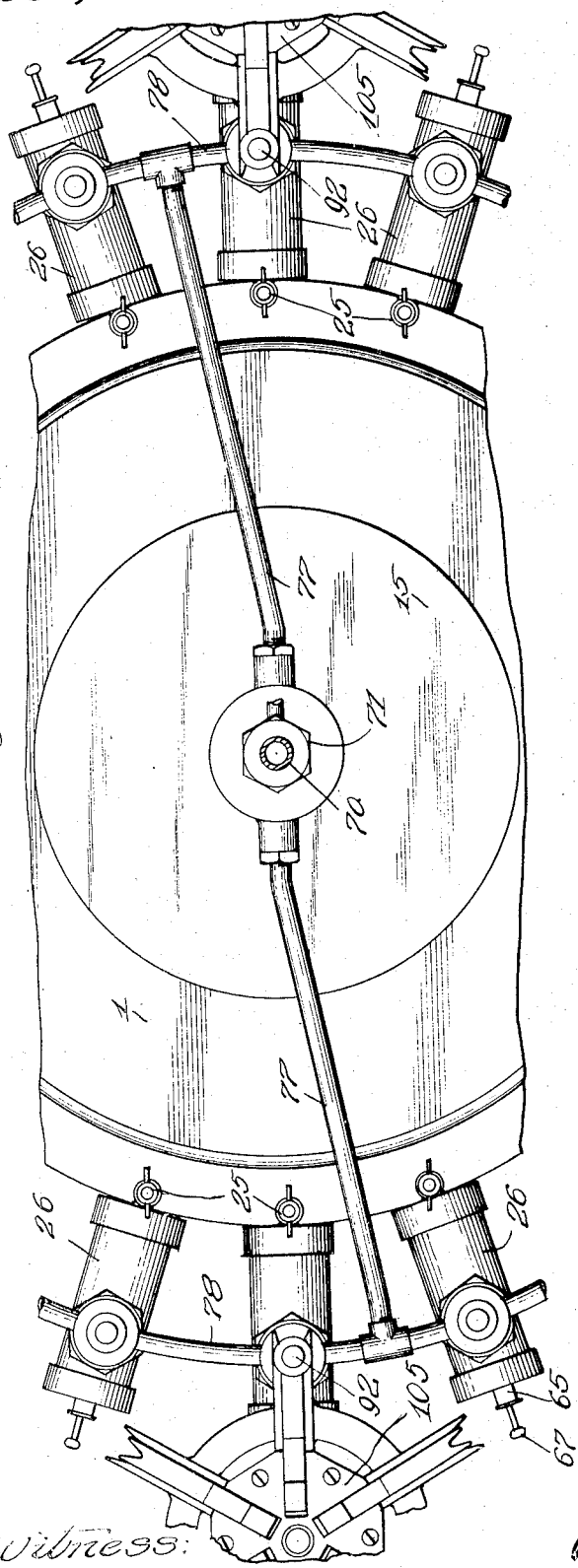
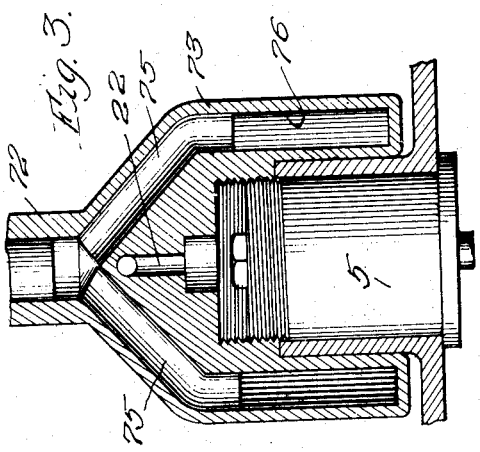

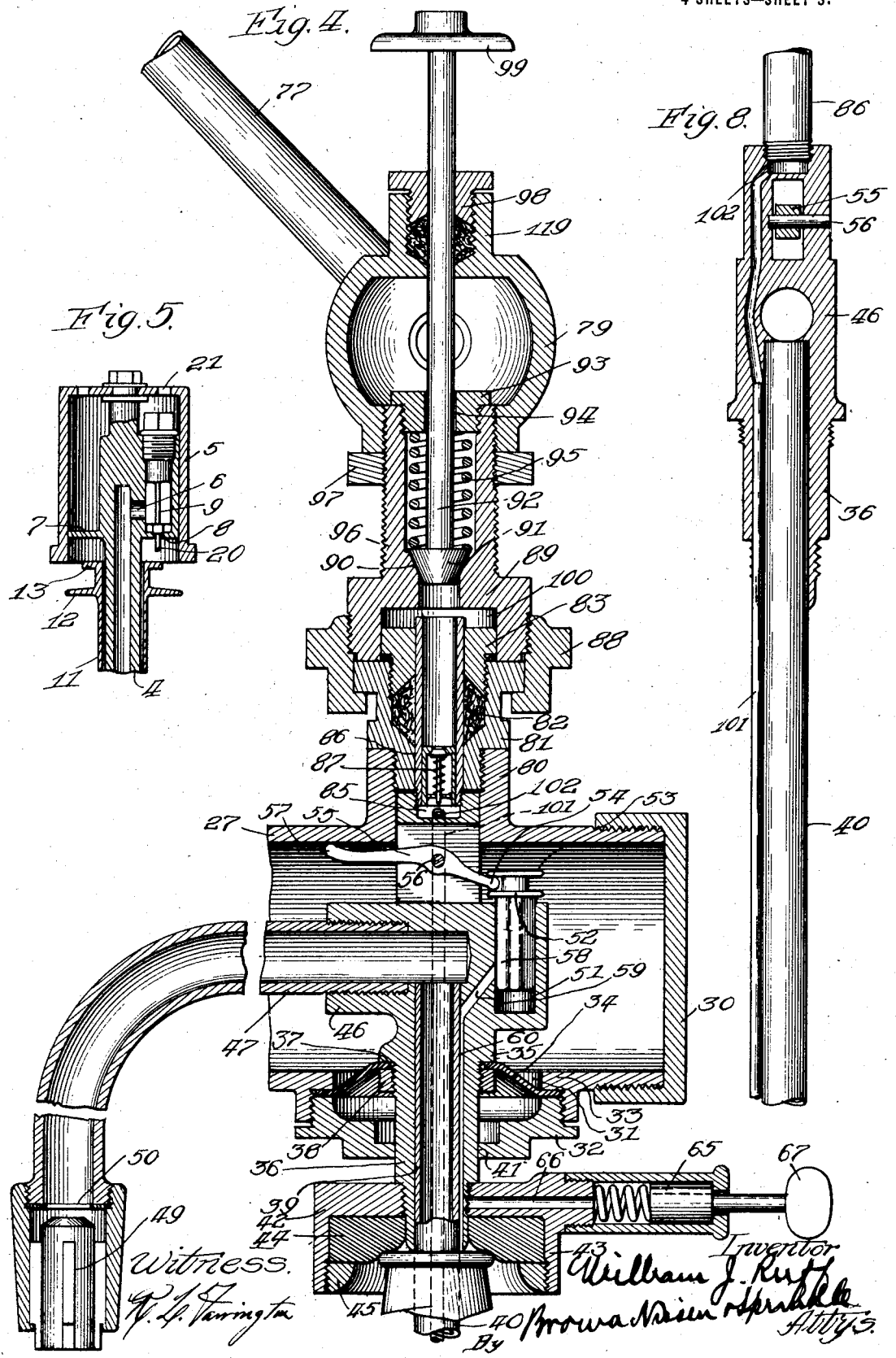

W. J. RUFF.
METHOD FOR PRESERVING CARBONATED BEVERAGES.
APPLICATION FILED FEB. 25, 1916.
1,361,498.
Patented Dec. 7, 1920.
4 SHEETS—SHEET 4.
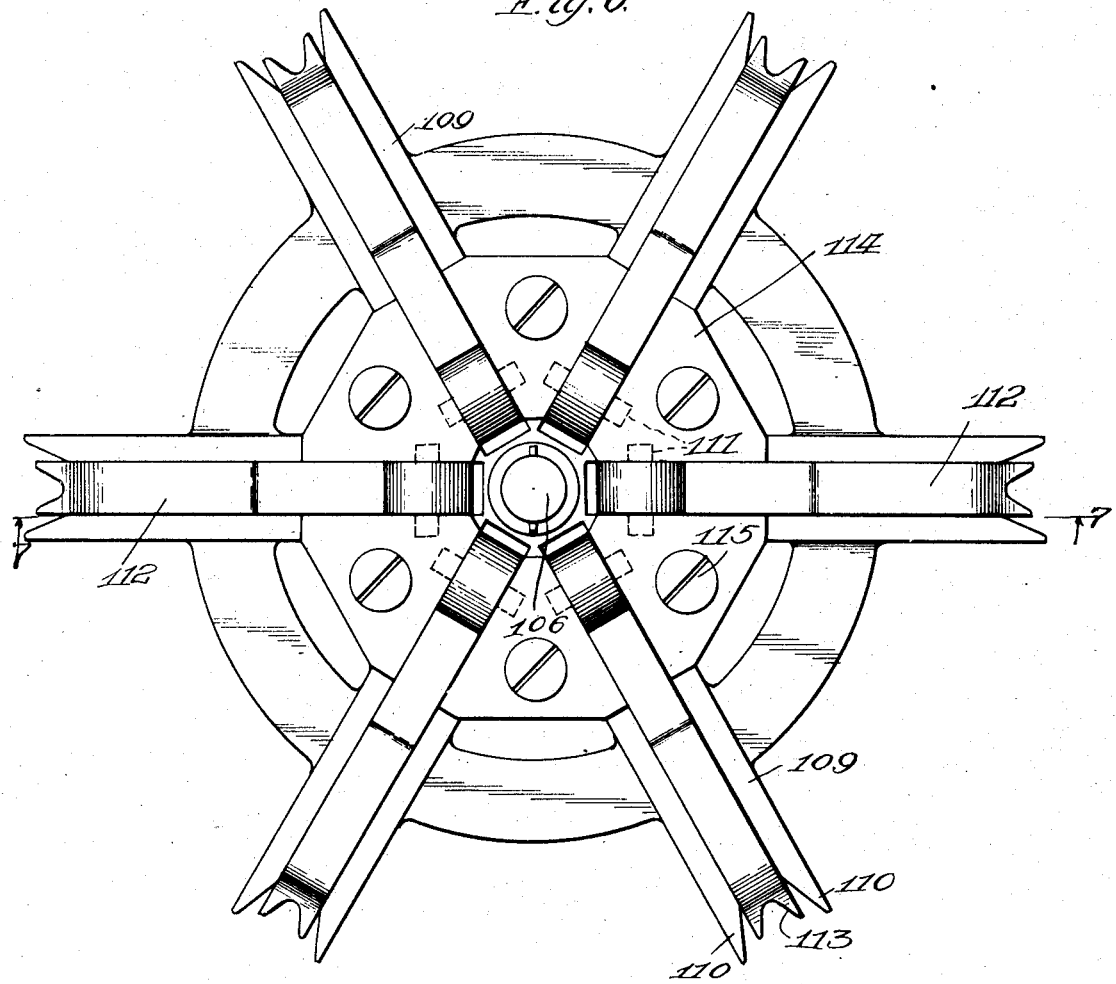
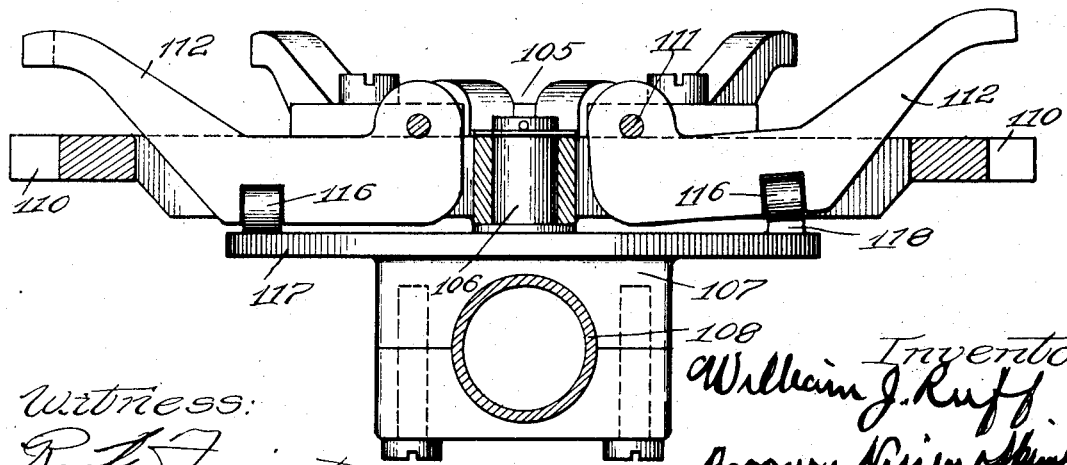

UNITED STATES PATENT OFFICE.

WILLIAM J. RUFF, OF QUINCY, ILLINOIS.

METHOD FOR PRESERVING CARBONATED BEVERAGES.

1,361,498.            Specification of Letters Patent.       Patented Dec. 7, 1920.

Application filed February 25, 1916. Serial No. 80,349.

*To all whom it may concern:*

Be it known that I, WILLIAM J. RUFF, a citizen of the United States, residing at Quincy, in the county of Adams and State of Illinois, have invented certain new and useful Improvements in Methods for Preserving Carbonated Beverages, of which the following is a specification.

This invention relates to the bottling and preserving of carbonated beverages, especially beer, and has for its object the better preservation of the beverage treated. The invention is exemplified in the combination and arrangement of parts and in the steps of the process shown in the accompanying drawings, and described in the following specification, and it is more particularly pointed out in the appended claims.

Referring to the drawings—Figure 1 is a fragmentary vertical sectional view of a bottling machine comprising the invention; Fig. 2 is a top plan view of the machine shown in Fig. 1; Fig. 3 is a fragmentary vertical sectional view of details of construction of a portion of the machine; Fig. 4 is a fragmentary vertical sectional view of the filling spout; Fig. 5 is a detailed vertical sectional view of a portion of the machine; Fig. 6 is a top plan view of a tripping wheel used in connection with the filler; Fig. 7 is a vertical sectional view substantially on line 7—7 of Fig. 6; Fig. 8 is a detail view of the filler spout showing the gas discharge conduit.

In the preservation of beer and other beverages which contain oxidizable substances of which the albuminous food products in beer are an example, it is desirable to protect the beverage at all times from oxidization which occurs whenever the beverage is brought into contact with the atmosphere. In the present invention the beer both during the bottling process and after it has been sealed in the bottles, is kept entirely from contact with the atmosphere.

In the drawings, the numeral 1 designates a closed chamber of a well known form of bottling machine which is supported by mechanism not shown for rotation about a central vertical axis. The interior of the chamber is connected by a central downwardly extending passage 2 with a supply of beer kept under a substantially constant pressure. The beer in the chamber is normally maintained at the level designated by the broken line 3, the upper portion of the chamber being filled with a gas under pressure, which is supplied through a pipe 4. The upper end of the pipe 4 connects with a cylindrical chamber 5 through a passage 6, as best shown in Fig. 5. The bottom wall 7 of the chamber 5 has an opening 8 therein controlled by a valve 9 and communicating with the upper portion of the chamber 1. A metallic float 10 is mounted within the chamber 1 and is guided for vertical sliding movement on the gas supply pipe 4. The float 10 is provided with an upwardly extending stem 11 having a pair of flanges 12 and 13 at its upper end. Supported by a pivot 14 from the lower surface of the cover plate 15 of the chamber 1, is a lever 16 one end of which extends to a position between the circular flanges 12 and 13 on the stem 11. The opposite end of the lever 16 extends below and supports a vertically sliding valve 17 adapted to fall by gravity into position for closing a passage 18 connecting the upper portion of the chamber 1 with the outer atmosphere. The valve 17 is provided with a detachable casing 19 for holding it in position, the construction of this valve being best shown in Fig. 1. The valve 9, as shown in Fig. 5, is provided with a downwardly extending guide stem 20 arranged to contact with the upper flange 13 of the float stem 11 when the float is raised. If the liquid in the chamber 1 rises, it will carry the float 10 and the stem 11 upwardly with it and bring the flange 13 into contact with the valve stem 20, thus raising the valve and opening the passage 8 to connect the upper portion of the chamber 1 with the source of gas supply through the pipe 4. Gas under pressure will thus be admitted into the chamber 1 and the liquid in the chamber will be forced downwardly until the valve 20 is closed. If, on the other hand, the liquid in the chamber is lowered, the stem 11 will move downwardly, permitting the valve 9 to close the passage 8 and at the same time causing the flange 13 to contact with the lever 16 to raise the valve 17 from its seat. This will connect the chamber 1 with the outer atmosphere and permit the escape of some of the gas within the chamber. When this occurs, the pressure on the liquid supply will cause the liquid to enter through the pipe 2 and raise the level of the liquid within the chamber. By this construction, the liquid is maintained at a substantially constant level within the chamber 1. The upper end of the cylindrical chamber 15 is provided with perforations 21 which permit the gas from the pipe 4 to fill the space above the cylinder 5 which is connected through a passage 22 with the pressure gage 23 for indicating the pressure of the gas being supplied to the supply chamber 1. The cover plate 15 is securely held in place on the upper portion of the chamber 1 by a plurality of T-bolts 24 and thumb nuts 25.

Extending radially from the periphery of the supply chamber 1 are a number of filling spouts 26. The construction of these spouts is best shown in Fig. 4 and each spout is provided with a main hollow cylindrical portion 27 secured by couplings 28 to nipples 29 communicating with the interior of the chamber 1. The outer ends of the cylindrical portions 27 are closed by caps 30. Each of the cylinders 27 is provided with a downwardly directed opening 31 provided with a screw plug 32. The opening 31 is provided with a circumferential flange 33 against which the outer periphery of a diaphragm 34 is held by the screw plug 32. Supported within the cylinder 27 is a fitting 35 having a downwardly extending stem 36 which passes through an opening in the center of the diaphragm 34 and is provided with a shoulder 37 against which the inner portion of the diaphragm is held by a nut 38 threaded on the downwardly extending stem 36. The stem 36 is provided with a longitudinal opening 39 in the interior of which a filler pipe 40 is tightly fitted. The stem 36 passes through a central opening 41 in the screw plug 32 and is free to move up and down through this opening, the diaphragm 34 permitting a limited movement of the fitting 35 in a vertical direction and yet preventing the escape of gas from the interior of the cylinder 27 through the opening 41 around the stem 36. The diaphragm acts as a stuffing box for the stem 36. The lower end of the stem 36 has a filler head 42 threaded thereon provided with a downwardly opening cup portion 43 in which a packing 44 of rubber or similar material is held by a threaded ring 45. The filling tube 40, as shown in Fig. 1, extends downwardly a considerable distance from the lower end of the stem 36, the proportion being such that when the mouth of a bottle is in contact with the packing 44 the lower end of the tube 40 will extend to a position near the bottom of the bottle being filled. The central portion of the fitting 35 is provided with an inwardly extending internally threaded portion 46, the interior of which communicates with the filler tube 40. Threaded to the interior of the portion 46 is an inwardly extending goose-neck 47 which, as shown in Fig. 1 projects through the nipple 29 into the interior of the chamber 1 and has a downwardly turned portion 48 within the chamber 1, which is provided, as shown in Fig. 4, with a gravity actuated valve 49. The valve 49, when raised, is arranged to fit the seat 50 on the end of the gooseneck pipe 47 and thus close the passage leading from the chamber through the gooseneck to the filling tube 40. The entire gooseneck moves up and down with the fitting 35 and when it is in its lowermost position the end of the valve 49 will rest upon the bottom of the chamber 1, forcing the valve to close the passage through the gooseneck to the filler tube. When the fitting 35 is raised, however, the valve 49 will drop by gravity away from its seat 50 and leave a free passage for the flow of liquid through the gooseneck to the filler tube 40.

The side of the fitting 35 opposite the gooseneck 47, is provided with an opening 51 in which a valve 52 is mounted for vertical movement. The valve 52 has a pair of circular flanges 53 at its upper end, forming a groove into which the end 54 of a lever 55 extends. The lever 55 is fulcrumed at its central portion to pivots 56 carried by the upper portion of the fitting 35. The end 57 of the lever 55 opposite valve 52, is arranged to contact with the upper wall of the cylinder 27 whenever the fitting 35 is moved upwardly. This causes the portion 54 of the lever to move upwardly more rapidly than the fitting 35, thus raising the valve 52 in the opening 51. The valve 52 is provided with passages 58 permitting the free passage of gas from the interior of the cylinder 27 to the lower portion of the opening 51. The fitting 35 is bored at 59 to form a passage from the opening 51 to the interior of the opening 39 in the stem 36. The stem 36 has a longitudinally extending recess 60 connecting the inner end of the passage 59 with the lower end of the stem. When the valve 52 is moved upwardly the gas from the interior of the chamber 1 will be permitted to flow through the passages 58, 59 and 60 and to escape at the lower end of the stem 36. When the fitting 35 moves downwardly, however, the valve 52 will close the passage 59 and prevent escape of gas by this means.

During the filling operation, the bottles 61 are moved upwardly by bottle supports 62, one of which is provided for each spout 26. The supports 62 are mounted to rotate with the chamber 1 and its filling spouts and pneumatic cylinders of well known construction are used to move the bottles upwardly into contact with the filling heads at predetermined positions in the rotation of the parts. The mechanism for operating the bottle lifting seats 62 is well known and need not be here described. It is sufficient to say that at a given position in the rotation of the filling device, air is admitted into a lifting cylinder which raises the bottle until its mouth contacts with the head 43 in which position the bottle is held until it is filled, after which the air in the lifting cylinder is allowed to escape and the bottle slowly descends until the filling tube 40 is withdrawn from the mouth of the bottle. After the tube 40 is removed from the bottle, the bottle is taken from the machine and capped. From the time the bottle begins to rise until it is filled and permitted to start on its downward movement, the filler makes substantially one half of a revolution, approximately one quarter of a revolution being consumed in moving the bottle into filling position and the other one quarter being employed for filling operation. During the third quarter of the revolution, the bottle is brought back to its lowest position and the last quarter of the revolution is allowed for removing the filled bottle and replacing it by an empty one.

When the mouth of the bottle is pressed into contact with the packing 44 of the head 42, the entire filling head, including the fitting 35 and the gooseneck 47, will be moved upwardly by the bottle lifter. This will permit the valve 49 to open the passage through the gooseneck and at the same time will move the valve 52 to open the passages 59 and 60 to connect the mouth of the bottle with the upper portion of the interior of the chamber 1. When the device is in this condition, the gooseneck 47 and the filler tube 40 form a siphon the upper end of which dips into the liquid in the chamber 1, while the lower end extends to a position near the bottom of the bottle to be filled. At the same time the pressure in the bottle and the pressure in the chamber 1 will be kept the same, because of the communicating passage formed through the valve 52 and connected parts. While this condition is maintained, the liquid will be siphoned from the chamber 1 into the bottle being filled and the liquid will rise in the bottle to a point level with the upper surface 3 of the liquid in the chamber. As the liquid flows into the bottle, the gas in the bottle will escape through the passage 60 and valve 52 into the upper portion of the chamber 1. After the bottle has been filled and begins to move downwardly, the valve 49 will be brought into contact with the bottom of the chamber 1, thus closing the passage through the gooseneck 47 and at the same time the valve 52 will be caused to close the passage 59. Thus all communication to the interior of the chamber 1 is again shut off, after which the mouth of the bottle will be moved away from the packing 44 in the filler head. The bottle continues to move downwardly until the filler tube 40 is entirely withdrawn. The displacement of the filler tube 40 will leave a space in the upper portion of the bottle which will be filled as the bottle descends with air from the surrounding atmosphere. This air, in the present invention, is displaced before the bottle is removed, by an inert gas in a manner which will be described.

When the machine is first set up, in order to start the operation of the siphon formed by the filler tube 40 and the gooseneck 47, it is necessary, when the bottles are first brought into contact with the filler heads 42, to connect the mouths of the bottles with the outer atmosphere. This is done by means of spring pressed valves 65 which control the passages 66 leading to the passages 60. By this construction, when the plungers 67 are pressed inwardly, the lower portions of the passages 60 and the interior of the bottles communicating therewith are connected with the outer atmosphere, thus permitting the pressure on the liquid in the chamber 1 to force the liquid through the goosenecks into the filling tubes and thus establish the siphon which is then continuously maintained.

In order to prevent oxidization of the beverage, the gas supplied through the tube 4 to the chamber 1 should be an inert gas, carbonic acid being the gas commonly used for this purpose, since this is the gas with which beer and other carbonated beverages are charged. The empty bottles, when supplied to the machine, are however filled with air, and during the filling operation the gas in the bottle flows outwardly into the chamber 1. It is necessary to permit the gas to escape from the bottle into the chamber in order that the pressure may be maintained uniformly in the bottle and chamber, to insure proper filling of the bottles by the siphon. A constant discharge of air from the bottles into the chamber 1 will soon cause sufficient air to accumulate within the chamber to produce injurious oxidation of the beverage in the chamber. To prevent this, the present invention contemplates the displacement of the air in the bottles by carbon dioxid, just before the bottles are connected with the filling spouts. To accomplish this, a pipe 70 is led from a source of carbonic acid gas under pressure, to a position above the central upper portion of the filling machine. Pipe 70 is connected to the central portion of the machine by means of a stuffing box 71 which permits the rotation of the machine relative to the pipe. The lower member 72 of the stuffing box 71 is expanded at its lower end, as shown in Figs. 1 and 3, to form a distribution head 73 which fits over the upper portion of the cylindrical chamber 5. The central portion of the distribution head 73 is bored, as previously stated, at 22 to form a connection between the interior of the cylindrical chamber 5 and the gage 23. Extending diagonally downwardly from the lower end of the opening in the portion 72 and in a plane at right angles to the connection with the gage 23, are a pair of openings 75 which communicate at their lower ends with a circular chamber 76 in the portion of the distribution head 73 located around the cylindrical chamber 5. A plurality of pipes 77 extend laterally from the upper portion of the distribution head 73 and communicate at their inner ends with the chamber 76, there being two such pipes shown in the form of the invention illustrated in the drawings. The pipes 77 are connected at their outer ends with short pipe sections 78 which form, in connection with the upper portions of the filler spouts, a continuous pipe or conduit extending in a ring entirely around the filling machine. The pipe sections 78 are connected with fittings 79 and the relation of these fittings to the filler spouts is best shown in Fig. 4. As illustrated in this figure, the spout cylinders 27 are provided at their upper portions with internally threaded nipples 80. Each of these nipples has a stuffing box 81 provided with packing 82 and a gland 83 threaded therein. The fitting 35 is provided at its upper end with a cylindrical guide lug 84 which extends into the opening in the nipple 80 for guiding the fitting 35 and connected parts as it moves up and down in the spout cylinder 27. The upper end of the guide lug 84 is bored out at the top to form a recess 85 into which the lower end of a valve stem 86 is threaded. The valve stem 86 is provided with a spring pressed valve 87 to prevent upward flow of gas therein and the stem itself is fitted for sliding movement through the packing 82 of the stuffing box 81. Connected to the upper portion of the stuffing box 81 by a union 88 is a valve member 89 provided with a valve seat 90 which coöperates with a cone valve 91 carried on the lower end of the valve stem 92. The valve stem 92 extends through a plug 93 threaded into the end of the valve fitting 89 and openings 94 are provided to permit the passage of gas through the plug 93. A helical spring 95 contacts at its lower end with the cone valve 91 and at its upper end with the lower surface of the plug 93 to hold the valve normally in contact with its seat. The fitting 79 is threaded to the upper end of the valve casting 89 by a long thread 96 and is held in place by a lock nut 97. The long thread 96 permits upward movement of the valve casting 89 into the fitting 79 when the union 88 is disconnected. In this way the valve casting 89 may be moved out of the way to permit insertion of the stuffing box 81 into the nipple 80. The valve stem 92 passes upwardly through the fitting 79 and extends outwardly from the upper portion of the fitting through a stuffing box 98. The upper end of the valve stem is provided with an operating disk or button 99 by means of which the cone valve 91 may be lifted from its seat. When the valve 91 is lifted from its seat the gas which is fed to the interior of the fitting 79 by the pipe 77 will flow downwardly through the passages 94 and the valve 90 into the open space 100, and thence through the valve stem 86 and valve 89 into the open space 85. From the open space 85 the gas will flow through a conduit 101 to a point at the lower end of the filler tube 40 where it will be discharged. The conduit 101, as best shown in Fig. 8, is a small tube preferably made of soft metal such as brass or copper and soldered to a groove made in the periphery of the filler tube 40. The fitting 35 is bored as shown in this figure, to receive the conduit 101 and to direct it around the opening in the interior of the fitting to a point 102 where it opens into the chamber 85.

In order to lift the valve 91 to discharge gas from the lower end of the conduit 101, at proper times in the filling operation, mechanism, best shown in Figs. 6, 7 and 8, is provided to coöperate with the disk 99 carried at the upper end of the valve stem. This mechanism comprises a wheel designated generally by the numeral 105 and mounted for rotation on a vertical spindle 106 secured by clamps 107 to a horizontal pipe 108 which may be supported on a pedestal in any suitable manner in proper position near the periphery of the filling machine. The wheel 105 is provided with radial arms 109 having bifurcations 110. Pivotally supported between the bifurcations 110 by horizontal pivot pins 111 are lifter arms 112. Each of the arms 112 is bent upwardly at its outer end and is provided with a notch 113 arranged to engage the valve rod 92 beneath the disk 99, as shown in Fig. 1. The pivot pins 111 are held in place by triangular plates 114 secured to the wheel 105 by screws 115. Each of the lifter arms 112 is provided with a roller 116 which travels on a table or runway 117 rigidly carried by the clamp 107 by means of which the wheel 105 is supported. On the side of the runway 117 adjacent the filling machine is a cam 118 in the path of movement of the rollers 116, and arranged to raise the lifters 112 when they pass a position opposite the filling machine. The arms 109 are so proportioned that their bifurcated portions 110 will mesh with upwardly extending cylindrical portions 119 of the fitting 79 to rotate the wheel 105 in unison with the rotation of the filling machine, as shown in Fig. 2. By this construction, as each filler spout 26 passes the wheel 105, one of the arms 109 will contact with the cylindrical portion 119 carried by the spout and at the same time one of the notches 113 will engage the valve stem 92 beneath the disk 99. As the wheel 105 is rotated by the movement of the filling machine, the roller 116 will pass over the cam track 118 and raise the lifter 112 and with it the disk 99 and valve stem 92, thus opening the valve 91 and permitting a discharge of gas through the passages previously described, from the lower end of the conduit 101.

In operation, filled bottles are removed from the bottle carrier 62 and empty bottles are substituted therefor at a given position in the rotation of the filling machine. As the empty bottles are carried by the support 62 with the machine as it rotates, each bottle will pass the position where air is admitted to the lifting cylinders and the bottle will be moved upwardly to cause the filler tube 40 to enter the open mouth of the bottle. As the bottle continues to move upwardly, it will reach the position shown at the left in Fig. 1, at which the mouth of the bottle is almost in contact with the head 43. When the bottle is in this position, it is brought past one of the trip wheels 105 and the valve 91 is opened for a short period of time while the lifter 112 is raised by the cam 118, and carbonic acid gas will be discharged from the end of the conduit 101 into the bottle 61 near the lower portion thereof. The discharge of carbonic acid gas will be sufficient to force all of the air from the bottle and replace it with the gas. The gas being heavier than air will remain in the bottle and the bottle will be almost immediately brought into contact with the head 43. After such contact has been made, the valve 49 will be opened by the upward movement of the bottle, as previously described, and beer will be drawn by the siphon from the container 1 and discharged into the bottle near the lower portion thereof. As the bottle is filled, the carbonic acid gas previously discharged into it will be forced out of the bottle into the upper portion of the chamber 1 through the valve 52 and connecting passages, in the manner previously described. By displacing the air in the bottle 61 by carbonic acid gas prior to the connection of the bottle with the filling machine, carbonic acid gas instead of air is forced from the bottle into the supply chamber, and in this way the beer in the chamber is completely kept from contact with any oxygen during the entire filling process. The bottle continues to rotate during the filling operation and will pass through approximately one quarter of a revolution before it is completely filled. After the filling is complete, the bottle lifting mechanism will be tripped and the bottle will begin to descend. As soon as this happens its connections with the supply chamber will be closed and immediately thereafter the bottle will be moved away from the filler head 43 and the filler tube 40 will begin to be withdrawn from the bottle.

When the bottle starts to move downwardly, the weight of the filler head, gooseneck and attached parts will cause the filler head to follow the bottle until the valve 49 strikes the bottom of the supply chamber 1. This downward movement is somewhat resisted, however, by the packing 82 of the stuffing box 81 and in order to insure positive movement of the head downwardly, a spring 120 is provided which bears against the lower portion of the filler spout and presses downwardly on the upper surface of the filler head 43. The operation of the lifter arm 112 is so timed relative to the movement of the bottle into contact with the filler head 43, that the valve 91 will be closed before the valves connecting the bottle with the supply chamber 1 are opened. In this way the valve 91 is closed while the gas in the bottle is subjected to atmospheric pressure. As soon as the valve 52 is opened to connect the bottle with the chamber 1, there will be a tendency for the gas in the chamber to cause a back pressure in the conduit 101 and the passages connected with the upper end thereof. If it were not for the valve 87 the gas in the chamber 100 and in the valve stem 86 would thus be subjected to the pressure of the tank 1. If this were permitted, as soon as the bottle was moved away from the filler head and the pressure in the bottle thus reduced, the gas in the chamber at the upper end of the conduit 101 would expand and produce bubbling in the liquid in the bottle. The valve 87, however, is introduced into the lower end of the tube 86 to prevent such back pressure and thus avoid discharge of gas from the conduit 101 when the bottle is disconnected from the filler head.

The downward movement of the bottle will consume approximately one quarter of a revolution of the filling machine and when the bottle is in a position substantially opposite that at which the gas supply valve 91 was first tripped, the filler tube 40 will be almost withdrawn from the filled bottle, as indicated at the right in Fig. 1. At this position a second tripping wheel 105 is provided which will again open the gas supply valve and discharge a second quantity of gas into the upper portion of the filled bottle. The object of this second discharge of gas into the bottle, is to displace the air which fills the space at the upper end of the bottle due to the displacement of the filler tube 40. The gas will be discharged with sufficient velocity to force all of the air from the neck of the bottle and since the gas is heavier than air, it will remain in the bottle a sufficient length of time to permit the removal of the bottle from the machine and the placing of a cap thereon, while the neck of the bottle is still filled with carbonic acid gas. The entire operation is carried out with the beer at a low temperature, to prevent foaming. Bottles of beer filled by the above described process are entirely free from oxygen due to the fact that the beer is kept from contact with air during the entire filling operation and all of the air which enters the neck of the bottle during the very short period of time that the bottle is open after the filling, is removed and replaced by carbonic acid gas. This method of preserving beverages, in addition to preventing oxidation, also is of great advantage in excluding deleterious bacteria from the beverage. In the manufacture of beer it is quite common to sterilize the beer either by heating it or by filtration, or by some other well-known method and when this is done the beer so sterilized is supplied to the chamber 1 and since no air is permitted into this chamber at any time during the filling operation, there is no opportunity for the beer to become contaminated by bacteria suspended in the atmosphere, the bottles also having been sterilized after the air is removed from them by a gas which has not been exposed to atmospheric contamination, and hence the whole operation is carried on in a practically aseptic manner, so that the beer is free from the deleterious effects both of the oxygen in the air and dust and bacteria suspended therein. Beer put up in this way will retain its flavor and food value practically indefinitely and is very much less susceptible to the effect of light rays, because of the fact that there is no oxygen within the package to cause oxidation of the constituents of the beer, especially the albuminous products.

What I claim is:

1. The method of preserving beverages consisting in filling a vessel with an inert gas to expel air from said vessel, filling the vessel with a beverage nearly full, introducing a new quantity of inert gas to the vessel above the beverage, and finally sealing the vessel.

2. The method of preserving beverages consisting in filling a vessel to near the top with a beverage through a tube inserted in the vessel, then removing the tube from the vessel and introducing an inert gas into the vessel above the beverage, and finally sealing the vessel.

3. The method of preserving beverages consisting in filling a vessel with an inert gas, filling the vessel substantially full with a beverage through a tube inserted in the vessel and expelling the inert gas, and finally withdrawing the tube from the vessel and filling the top of said vessel with an inert gas as the tube is withdrawn.

4. The method of preserving beverages consisting in filling a vessel substantially full with a beverage, then lowering the height of the beverage in the vessel and filling the space in the vessel above the beverage with an inert gas, and finally sealing the vessel.

5. The process of preserving a liquid which consists in supplying such liquid to a chamber partially filled with inert gas, filling a vessel with an inert gas to expel air therefrom, filling the vessel substantially full with liquid from said chamber and forcing the inert gas from said vessel to said chamber, lowering the level of the liquid in the vessel, filling the space at the top of the vessel above the liquid with an inert gas, and then sealing the vessel.

6. The method of preserving a liquid which consists in supplying the liquid to a chamber from which air is excluded, supplying gas under pressure to said chamber above the liquid therein, connecting the liquid within said chamber by means of a siphon with the bottom portion of a vessel from which air has been replaced by gas of the same character as that within said chamber, connecting the upper portion of said vessel by means of a closed passage with the gas containing portion of said chamber substantially filling said vessel with a liquid through said siphon and forcing the gas from said vessel into said chamber, disconnecting said vessel from said chamber and lowering the level of liquid in the vessel, filling the space in the vessel above the liquid with an inert gas, and finally sealing said vessel.

In testimony whereof I have signed my name to this specification, on this 24th day of January, A. D. 1916.

WILLIAM J. RUFF